(12) United States Patent
Petersen (10) Patent No.: US 9,612,342 B2
(45) Date of Patent: Apr. 4, 2017

(54) GNSS POSITIONING SYSTEM INCLUDING AN ANTI-JAMMING ANTENNA AND UTILIZING PHASE CENTER CORRECTED CARRIER

(75) Inventor: James L. Petersen, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 1230 days.

(21) Appl. No.: 13/618,522

(22) Filed: Sep. 14, 2012

(65) Prior Publication Data

US 2013/0241768 A1    Sep. 19, 2013

Related U.S. Application Data

(60) Provisional application No. 61/536,827, filed on Sep. 20, 2011.

(51) Int. Cl.
*H01Q 3/00* (2006.01)
*G01S 19/44* (2010.01)
(Continued)

(52) U.S. Cl.
CPC .............. *G01S 19/44* (2013.01); *G01S 19/23* (2013.01); *G01S 19/36* (2013.01); *G01S 19/43* (2013.01);
(Continued)

(58) Field of Classification Search
CPC .......... G01S 19/44; G01S 19/23; G01S 19/36; G01S 19/43; G01S 19/54; G01S 19/21; H01Q 3/26; H01Q 3/2605; H01Q 3/2611
(Continued)

(56) References Cited

U.S. PATENT DOCUMENTS 5,952,968 A * 9/1999 McDowell .............. G01S 19/21
342/357.59
6,236,355 B1 * 5/2001 Farmer ................. G01S 19/243
342/357.27
(Continued)

FOREIGN PATENT DOCUMENTS

EP     2293103 A2    3/2011
EP     2293104 A2    3/2011
WO    WO 2008/048283 A2    4/2008

OTHER PUBLICATIONS

Kees Stolk et al: "Phase Center Calibration and Multipath Test Resutls of a Dig8ital Beam-steered Antenna Array", Sep. 12, 2003, pp. 1998-1897, XP55191754, Proceedings of ION GPS 2003, Portland Oregon.
(Continued)

*Primary Examiner* — Chuong P Nguyen
(74) *Attorney, Agent, or Firm* — Cesari and McKenna, LLP (57) ABSTRACT

A carrier phase correction sub-system for use with a GNSS receiver that utilizes an active null and beam steering controlled radiation pattern antenna (CRPA) determines carrier phase corrections that compensate for antenna phase center movements in the carrier phase measurements taken from the CRPA filtered signal. The carrier phase sub-system utilizes measured radiation patterns, angles of incidence of the satellite signals at the CRPA, and the applied weights to determine carrier phase corrections to be applied to the CRPA filtered signals from which the carrier phase measurements are later taken or to the carrier phase measurements depending on the dynamics of the jamming signal. With the carrier phase corrected, the GNSS receiver may utilize known RTK techniques to resolve carrier cycle ambiguities.

22 Claims, 4 Drawing Sheets

(51) Int. Cl.
*G01S 19/43* (2010.01)
*G01S 19/36* (2010.01)
*G01S 19/54* (2010.01)
*G01S 19/23* (2010.01)
*H01Q 3/26* (2006.01)
*G01S 19/21* (2010.01)

(52) U.S. Cl.
CPC .............. *G01S 19/54* (2013.01); *G01S 19/21* (2013.01); *H01Q 3/2611* (2013.01)

(58) Field of Classification Search
USPC .............. 342/377, 357.27, 354, 368, 357.59; 701/474
See application file for complete search history.

(56) References Cited

U.S. PATENT DOCUMENTS

| | | |
|---|---|---|
| 6,466,177 B1 | 10/2002 | Kunysz |
| 6,727,846 B1 | 4/2004 | Brown |
| 6,727,849 B1 | 4/2004 | Kirk |
| 6,823,174 B1* | 11/2004 | Masenten ............ H01Q 3/2611 342/368 |
| 6,992,624 B2 | 1/2006 | Feller |
| 8,044,857 B2 | 10/2011 | Maenpa et al. |
| 8,089,402 B2 | 1/2012 | Maenpa et al. |
| 2003/0052825 A1* | 3/2003 | Rao ...................... H01Q 9/0407 343/700 MS |
| 2004/0210389 A1* | 10/2004 | Zimmerman ........ G01C 21/165 701/470 |
| 2006/0022869 A1* | 2/2006 | Zimmerman ........... G01S 11/02 342/458 |
| 2006/0022870 A1 | 2/2006 | Zimmerman |
| 2007/0052583 A1* | 3/2007 | Zhodzishsky .......... G01C 21/00 342/357.24 |
| 2010/0141513 A1 | 6/2010 | Lawrence |

OTHER PUBLICATIONS

O'Brien, A.J.; Gupta, I.J.;, Mitigation fo Adaptive Antenna Induced Bias Errors in GNSS Receivers, Aerospace and Electronic Systems, IEEE Transactions on, vol. 47, No. 1, pp. 524-538, Jan. 2011.

O'Brien, A.J.; "Adaptive Antenna Arrays for Precision GNSS Receivers" Ohio State University, 227 pages, 2009. Retrieved on the Internet, URL: http://etd.ohiolink.edu/send-pdf.cgi/OBrien%20Andrew%20J.pdf?osu1259170076. [retrieved on Oct. 23, 2012].

Chen, Yu-Hsuan et al, "Real-Time Software Receiver for GPS Controlled Reception Pattern Antenna Array Processing", Proceedings of the 23$^{rd}$ International Technical Meeting of the Satellite Division of the Institute of Navigation (ION GNSS 2010).

* cited by examiner

GNSS POSITIONING SYSTEM INCLUDING AN ANTI-JAMMING ANTENNA AND UTILIZING PHASE CENTER CORRECTED CARRIER

CROSS-REFERENCE TO RELATED APPLICATIONS

The present application claims the benefit of U.S. Provisional Patent Application Ser. No. 61/536,827, which was filed on Sep. 20, 2011, by James L. Petersen for a GNSS POSITIONING SYSTEM INCLUDING AN ANTI-JAMMING ANTENNA AND UTILIZING PHASE CENTER CORRECTED CARRIER and is hereby incorporated by reference.

FIELD OF THE INVENTION

The invention relates in general to GNSS positioning systems that use carrier phase measurements and, in particular, to GNSS positioning system that utilize anti-jamming antennas.

BACKGROUND INFORMATION

Multiple antenna element active null steering antennas are particularly useful in environments in which interfering signals, such as intentionally or unintentionally applied jamming signals, may otherwise adversely affect position determination based on GNSS satellite signals. The signals received by the respective antenna elements are weighted and combined to effectively produce one or more nulls that cancel out the jamming signals. As appropriate, the weighting also steers the antenna beam toward, or increases the gain of the antenna in the direction of, one or more transmitters. The active null steering antenna of interest is a controlled radiation pattern antenna (CRPA).

The signals received by the antenna elements of the CRPA are analyzed to determine the direction and elevation of a jamming signal, if present. The signals from the respective antenna elements are then weighted to provide a null that essentially cancels out the jamming signal, and thus, eliminates the contributions of the jamming signal to the signals that are processed for position determination. In addition, the weighting applied to the signals may also steer the beam toward the GNSS satellites in view, based on a single overhead pointing constraint, such as pointing skyward, that increases the gain in the desired direction. Multiple pointing constraints may be used to direct the antenna beam toward particular satellites or groups of satellites and/or to avoid multipath signals, and so forth. Alternatively, the constraints may be utilized to steer the antenna beam toward a given satellite and nulls may be produced around the beam, to effectively eliminate the contributions of both multipath and jamming signals to the signals that are analyzed for position determination.

The CRPAs work well to provide satellite signals from which pseudoranges can be determined based on code delays in an environment in which jamming signals are present. However, precision GNSS position determinations are made using carrier phase measurements of the respective GNSS satellite signals. Typically, short baseline real time kinematic (RTK) information is utilized by the receiver, or rover, operating with the CRPA, allowing the rover to quickly resolve carrier cycle ambiguities, correct for atmospheric conditions and satellite position errors, and so forth, such that positions with centimeter accuracies can then be determined from the carrier phase measurements of a plurality of GNSS satellite signals.

The systems employing short baseline RTK information typically operate with a base GNSS receiver and a rover GNSS receiver that are separated by a small number of kilometers, for example, less than 10 kilometers. The base receiver, which is in a known position, makes carrier phase measurements using GNSS signals transmitted from GNSS satellites in view and calculates pseudoranges from the respective satellites. The base receiver then determines differences between the pseudoranges calculated using the satellite signals and the ranges based on the known position of the receiver and the known locations of the satellites, to determine pseudorange correction information. The base receiver operating in a known manner broadcasts the RTK information, that is, the range correction information, pseudoranges, carrier phase measurements and various other information, to the rover receiver.

The rover receiver utilizes the broadcast pseudoranges, carrier phase measurements and other information to resolve integer carrier cycle ambiguities using well known, processing intensive, operations. The rover receiver utilizes the range correction information to correct for pseudorange errors related to changes in satellite orbits, atmospheric conditions, and so forth, that affect both the base receiver and the rover receiver in the same manner due to the short baseline between the receivers, all in a known manner.

Certain short baseline systems utilize fixed baselines that may, for example, employ two antennas situated at the rover receiver to determine the orientation or azimuth of the rover receiver. The antennas may be fixed to a vehicle, such as an automobile or a ship, and may, for example, be spaced apart by as little as 1 to ½ meter. Each antenna provides information that is utilized in well known short baseline RTK processing-intensive operations, to simplify the calculations involved in resolving the integer carrier cycle ambiguities for the respective antennas. Once integer carrier cycle ambiguities are resolved, the system can determine the azimuth or orientation of the vehicle based on the differences in the carrier phases measured at the two antennas. As is well known in the art, the short fixed baseline essentially reduces the complexity of resolving integer cycle ambiguities by changing the solutions from those of a 3-dimensional problem to those of a 2-dimensional problem.

Unfortunately, the active null and beam formation steering of the CRPA does not preserve the carrier phases of the received GNSS satellite signals. Instead, the active null and beam steering, that is, the application of the associated weightings to the signals received by the respective antenna elements, has the effect of moving the antenna phase center to different locations for the respective satellite signals. Accordingly, the null and beam steering introduces into the carrier phase measurements errors that adversely affect position determination since the carrier phase measurements from multiple satellites are required. Further, the short base line RTK information cannot be used effectively or at all to resolve carrier cycle ambiguities since the antenna phase center movements effectively result in different endpoints for the carrier phase measurements for the respective satellites, and thus, the short base lines can no longer be considered fixed.

What is needed is a mechanism to determine and correct for the movements of the antenna phase center attributable to the weighting of the signals from the plurality of antenna elements in an active null steering CRPA. Further, what is needed is such a mechanism that works with existing GNSS receivers that operate with CRPAs such than RTK information can be effectively utilized.

SUMMARY OF THE INVENTION

A carrier phase correction sub-system for use with a GNSS receiver that utilizes an active null steering controlled radiation pattern antenna (CRPA) determines carrier phase corrections that compensate for antenna phase center movements in the carrier phase measurements made using a signal that consists of a combination of weighted versions of the signals received at respective antenna elements. The sub-system determines azimuth and elevation angles for the respective satellites with respect to the orientation of an array of the CRPA antenna elements. The sub-system then calculates a phase adjustment or correction for the CRPA filtered version of signals received from a given satellite based on the azimuth and elevation angles and the vector associated with the satellite, corresponding measured radiation patterns associated the respective antenna elements and the weights applied to the signals received by the respective antenna elements. The correction is applied to the CRPA weighted, or filtered, received signals, to compensate for the phase motion that is introduced by the CRPA null steering process.

The phase adjustments are made prior to the taking of carrier phase measurements from the CRPA filtered signal, such that the carrier phase measurements for different satellites all have as an end point the phase center of the CRPA. The system then operates in a known manner to calculate position using the phase-adjusted carrier phase measurements.

BRIEF DESCRIPTION OF THE DRAWINGS

The invention description below refers to the accompanying drawings, of which.

DETAILED DESCRIPTION OF AN ILLUSTRATIVE EMBODIMENT

Figure 3A:
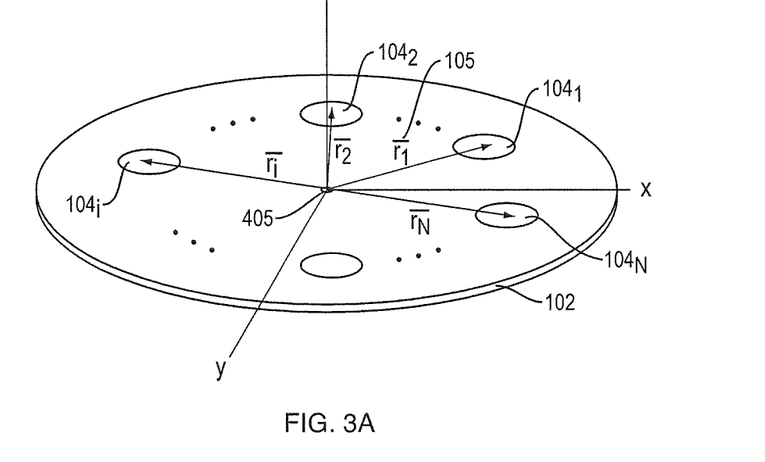
FIG. 3A is a functional block diagram of a typical CRPA antenna illustrating a reference frame and the positioning of antenna elements.
Figure 3B:
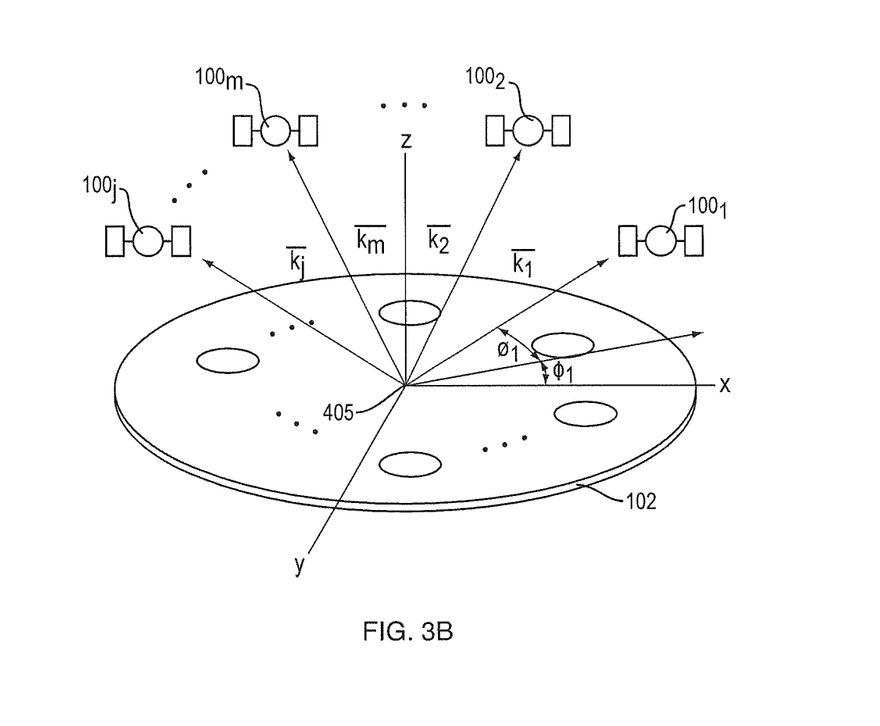
FIG. 3B is a functional block diagram of a typical CRPA antenna illustrating the relationship between the antenna reference frame and respective GNSS satellites.

Referring now to FIGS. 3A-B, a controlled radiation pattern antenna (CRPA) 102 consisting of an array 105 of N antenna elements $104_i$ receives signals from a plurality of GNSS satellites $100_j$. The antenna elements and the satellites are also referred to collectively by the reference numerals 104 and 100. The reference frame of the CRPA is defined with the origin of coordinate XYZ axes at the antenna phase center 405 of the array and the Z axis pointing outwardly from the antenna surface. Vectors from the phase center 405 to the respective antenna elements $104_i$ are denoted $\bar{r}_i$ and wave vectors, which describe the rates of change in phase in the directions of the wave propagation from the respective satellites $100_j$ to the phase center 405, are denoted $\bar{k}_j$. The azimuth $\phi_m$ and elevation $\Theta_m$ angles associated with a given satellite $100_m$ are similarly defined with respect to the coordinate axes.

Figure 1:
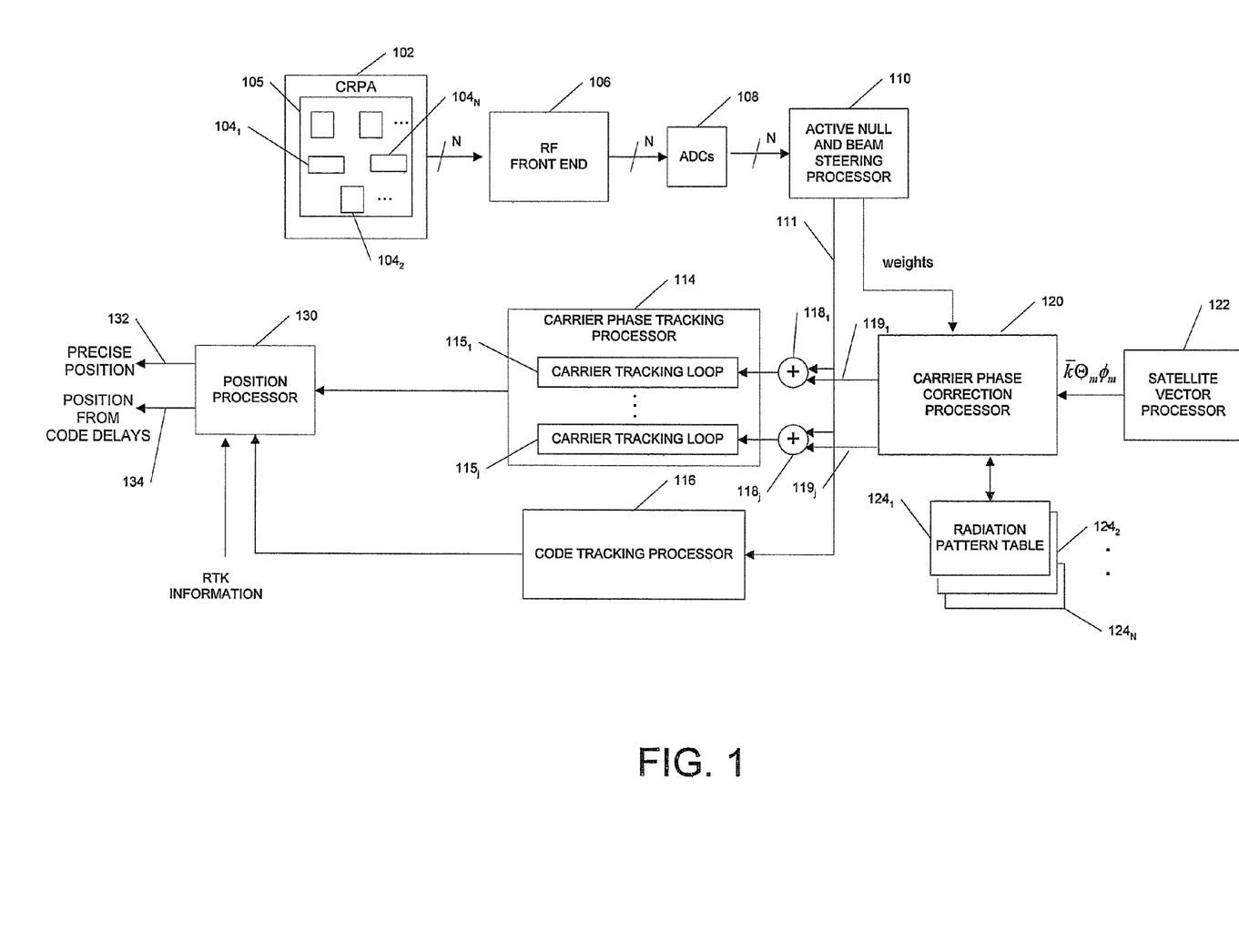
FIG. 1 is a functional block diagram of a system constructed in accordance with the invention.

Referring now also to FIG. 1, the received signals from the N antenna elements 104 are provided to N corresponding channels of an RF front end 106 that operates in a known manner to filter, amplify and, as appropriate, downconvert the signals. The signals are then provided to analog to digital converters (ADCs) 108. The ADCs operating in a known manner convert the N analog signals provided by the RF front end to N digital signals.

The N digital signals are supplied to an active null and beam steering processor 110, which operates in a known manner in accordance with a null and beam steering calculation to assign weights to the signals from the respective antenna elements $104_i$ in order to create a null in the direction of a jamming signal, if present. The null steering effectively cancels out the contribution of the jamming signal when the weighted signals associated with the respective antenna elements are combined.

As appropriate, the weights may also steer an antenna beam to all or respective ones of the GNSS satellites 100 in accordance with one or more overhead constraints. For example, the antenna beam may be constrained to point upward, i.e., skyward, to increase the gain in the direction of the plurality of GNSS satellites in view. Alternatively, the antenna beam may be steered toward particular satellites or groups of satellites, and so forth. Further, nulls may be provided around the steered beam, to provide cancellation of the jamming signal and, as appropriate, multipath signals. In the example, the active null and beam steering processor calculates the weights using a known technique, which is based on a well known QR decomposition of the signals received at the respective antenna elements.

The active null and beam formation steering is performed in a known manner by applying the calculated weights to the signals received by the respective antenna elements and combining the weighted signals to produce one or more CRPA filtered signals. The weights are complex values that, when applied to the signals received by the corresponding antenna elements, affect the gain and phase rotation of the signals to, for example, provide a null that essentially cancels out a jamming signal in the signals that are processed for position determination. Accordingly, the weights introduce phase movements into the CRPA filtered signals.

In the system of FIG. 1, the weights are also used by a carrier phase correction sub-system that consists essentially of a carrier phase correction processor 120, a satellite vector processor 122 and complex adders $118_j$. The sub-system computes carrier phase adjustments or corrections that the adders apply to the CRPA filtered signals before carrier phase measurements are taken from the signals in respective satellite tracking channels $115_j$ of a carrier phase tracking processor 114. The corrections result in removing from the carrier phase measurements phase center movements that are attributable to the CRPA weighting of the respective antenna element signals. While the complex adders $118_j$ are depicted in the drawing as being separate from the respective channels of the carrier tracking processor 114, the adders may instead be included in the channels. Alternatively, the complex adders may be included in the carrier phase correction processor and the CRPA filtered signals are then provided to the processor as well. The complex adders and the channels are also referred to collectively by the reference numerals 118 and 115.

The CRPA filtered signals, either before or after the phase adjustment, are supplied also to a code tracking processor 116 that operates delay lock loops (not shown) in a conventional manner to determine code delays associated with the respective satellite signals. The code delays are utilized by a position processor 130, to determine pseudoranges and position. The position based on the code delays is provided on line 134 and may be used by the satellite vector processor 122 to determine of the angles of incidence of the satellite signals, as discussed below. The position processor 130 provides on line 132 a more precise position that is determined using the carrier phase measurements taken from the phase-adjusted CRPA filtered signals and RTK information provided by an RTK base station (not shown).

The carrier phase correction processor 120 receives from the active null and beam steering processor 110 a weight vector $\overline{w}$ that includes the weight values $w_i$ that are applied to the signals received by the respective antenna elements $104_i$, and from the satellite vector processor 122 information relating to the angles of incidence of the satellite signals at the CRPA. The carrier phase correction processor then calculates phase adjustments to remove from the CRPA filtered signals the phase movements introduced to the received satellite signals by the null steering. Before discussing the operations of the carrier phase correction processor in detail, the operations of the satellite vector processor 122 are discussed.

The satellite vector processor 122 utilizes the time and satellite position information that is included in the navigation data on the satellite signals and/or as appropriate the time and satellite position information received as part of an RTK broadcast, to determine the positions of respective satellites in view.

The satellite vector processor 122 further determines the attitude or orientation of the CRPA, or more particularly, the antenna array 105, based on information provided by an operator or a configuration setting in the case of a fixed antenna location, or provided by a sensor such as an inertial sensor or a gyroscope (not shown) if the antenna moves with, for example, a vehicle. Alternatively, the satellite vector processor may determine the attitude of the antenna array based on the satellite positions, the calculated position of the CRPA and the times of arrival of the signals from the satellites at the respective antenna elements $104_i$, assuming that the jamming signal, in the absence of null steering, does not prevent the determinations of the times of arrival of the satellite signals.

If at least a pair of antenna elements $104_i$ are spaced apart by one wavelength or less of the carrier signals of interest, the attitude or orientation of the array 105 may instead be determined in the manner described in United States Patent Publication No. 2011/0090114 published Apr. 21, 2011 entitled ULTRA SHORT BASELINE GNSS RECEIVER, which is assigned to a common Assignee and incorporated herein by reference in its entirety. Alternatively, the orientation may be determined from the satellite positions and the positioning of a null at the GNSS signal source of interest as described in U.S. Pat. No. 6,992,624 which is assigned to a common Assignee and incorporated herein by reference in its entirety.

In addition, or alternatively, a phase map (not shown) as described in United States Patent Publication No. 20110090113 published Apr. 21, 2011 entitled SHORT AND ULTRA SHORT PHASE MAPS, which is assigned to a common Assignee and incorporated herein by reference in its entirety, may be used to determine the orientation of the antenna array.

Once the attitude of the antenna element array 105 is determined, the satellite vector processor 122 calculates an elevation angle $\Theta_m$ and an azimuth angle $\phi_m$ for a given satellite $100_m$ relative to the orientation of the array. The processor further calculates a wave vector $\overline{k}_m$ that describes the rate of change in phase in the direction of wave propagation from the given satellite. The wave vector is along the line-of-sight from the phase center 405 of the CRPA to the given satellite and the cartesian coordinates of $\overline{k}_m$ are defined as:

$$k_{m_x} = \frac{2\pi}{\lambda}\cos\theta_m\sin\phi_m$$

$$k_{m_y} = \frac{2\pi}{\lambda}\cos\theta_m\cos\phi_m$$

$$k_{m_z} = \frac{2\pi}{\lambda}\cos\phi_m$$

where $\lambda$ is the wavelength of the received carrier signal.

The satellite vector processor provides the angles and vectors for at least four of the satellites in view to the carrier phase correction processor 120. The carrier phase correction processor 120 uses the elevation $\Theta_m$ and azimuth $\phi_m$ angles to enter a set of N radiation pattern tables 124 (one for each antenna element $104_i$) and extract, for the respective antenna elements $104_i$, values $R_i$ corresponding to associated radiation patterns. The radiation pattern values $R_i$, which include gain and/or phase responses that are associated with the angles of incidence of the satellite signals with respect to the antenna elements, are determined in a known manner during calibration operations and represent the relative field strengths and phase variations of the antenna elements in the directions of the satellites.

The carrier phase correction processor 120 calculates phase correction values for the CRPA filtered versions of the respective satellite signals as:

$$Y_m = \sum_{i=1}^{N} R_i(\theta_m, \phi_m)w_i e^{j(\overline{k}_m \cdot \overline{r}_i)} = |Y_m|e^{j\Delta\psi_m}$$

where,
  $Y_m$ is the complex CRPA created distortion to the phase of the received signal from the m'th satellite;
  $\Theta_m$ is the elevation angle of the m'th satellite which is defined by the satellite position relative to the antenna array orientation;
  $\phi_m$ is the azimuth angle of the m'th satellite which is defined by the satellite position relative to the antenna array orientation;
  $w_i$ is the complex weighting factor for the $i^{th}$ antenna element determined by the CRPA null and beam steering algorithm;
  $R_i$ is the radiation pattern value for the $i^{th}$ antenna element;
  $\overline{k}_m$ is the wave vector which describes the rate of change in phase in the direction of the wave propagation from the m'th satellite being monitored to the phase center of the antenna array;
  $\overline{r}_i$ is the displacement vector from the phase center of the antenna array to the location of the $i^{th}$ antenna element;
  $\Delta\psi_m$ is the change in carrier phase attributable to the phase center movement caused by the CRPA steering process for the signal arriving from the m'th satellite, and $$\Delta \psi_m = \arctan\left(\frac{\text{imag}(Y_m)}{\text{real}(Y_m)}\right)$$

The unique carrier phase corrections $\Delta \psi_m$ associated with the respective satellites $100_m$ are provided to the complex adders $118_m$ on lines $119_m$ and are applied by the adders to the CRPA filtered signals before carrier phase measurements are taken, to align the end points of the carrier phase measurements to the physical phase center 405 of the antenna array 105. The carrier phase measurements of the signals from at least four satellites can then be used in a known manner to determine the precise position of the antenna array.

When a single overhead constraint of pointing upward is used, the weightings applied to the signals received by the antenna elements 104 for anti-jamming operations are the same across all of the satellites 100 in view. Accordingly, a single CRPA filtered signal is produced on line 111 for use in all of the processing channels 115 of the carrier phase tracking processor 114, as depicted in FIG. 1. Before the processing, the phase correction values $\Delta \psi_m$, which are unique to the respective satellite signals, are applied to the CRPA filtered signal by the complex adders $118_m$ such that the phase adjusted, or corrected, signals are processed in the respective processing channels $115_m$. The carrier phase measurements are thus made using the corrected CRPA filtered signals, and the carrier phase measurements have a common end point at the physical phase center 405 of the CRPA.

The phase adjusted, or corrected, CRPA filtered signals are processed in a known manner in carrier phase tracking loops in the channels 115, to determine the carrier phase measurements corresponding to the satellites 100. As discussed above, in the presence of a jamming signal, the weights applied to the antenna element signals by the active null and beam steering processor 110 would, without the corrections provided by the carrier phase correction sub-system, result in effective antenna phase center movements for the respective CRPA filtered satellite signals, and thus, introduce errors into the carrier phase measurements. Accordingly, without correction, the system would calculate an imprecise position. Further, phase center movements could preclude the use of short base line RTK technique to resolve carrier cycle ambiguities, since the baselines would also effectively move.

The position processor 130 utilizes the RTK information in a known manner, to resolve carrier cycle ambiguities in the carrier phase measurements. The RTK information may be used in this manner because the phase adjustment of the CRPA filtered signals by the carrier phase correction sub-system ensures that the carrier phase measurements all have as an endpoint the antenna phase center 405. The position determination processor can thus resolve the carrier cycle ambiguities relatively quickly and correct also for satellite position errors and atmospheric conditions that may otherwise adversely affect the position calculations. Accordingly, the position processor produces a precise position with centimeter accuracy based on the carrier phase measurements of the phase-adjusted CPRA filtered signals, utilizing the RTK information in a known manner.

If the delays through the N channels of the RF front end 106 and/or the ADCs 108 are too dissimilar, due to many factors including, for example, manufacturing or component variations, the delays may need to be re-aligned since excessive channel delay differences will affect the accuracy and stability of the pseudorange measurements. As necessary, phase and delay equalization calibration data are provided to correct for the phase and delay mismatch. The calibration data may be provided by a manufacturer or may be determined through calibration operations using GNSS satellite signals in an environment free of jamming signals. The satellite vector processor 122 may maintain the calibration data or the data may be stored in a table (not shown) accessible to the processor. As necessary, corrections for line biases are applied to the signals from the respective antenna elements prior to a determination of the attitude of the antenna array 105. Further the correction for line biases may be made to the CRPA filtered signals provided to the code tracking processor.

If the phase map discussed above is utilized, the corrections for line biases may be included in the phase map. In addition, corrections for antenna crosstalk and multipath attributable to a frame that holds the antenna elements in place may also be included in the phase map. Alternatively, a delay compensation processor (not shown) may be used. Such a processor may also compensate for and normalize the individual phase and gain differences between the antennas elements. The individual antenna element phase and gain differences may instead be compensated for in the weights applied in the active null and beam steering processor 110. Alternatively, the carrier phase correction processor 120 may include the line bias corrections in the phase adjustments applied to the CRPA filtered signal.

Figure 2:
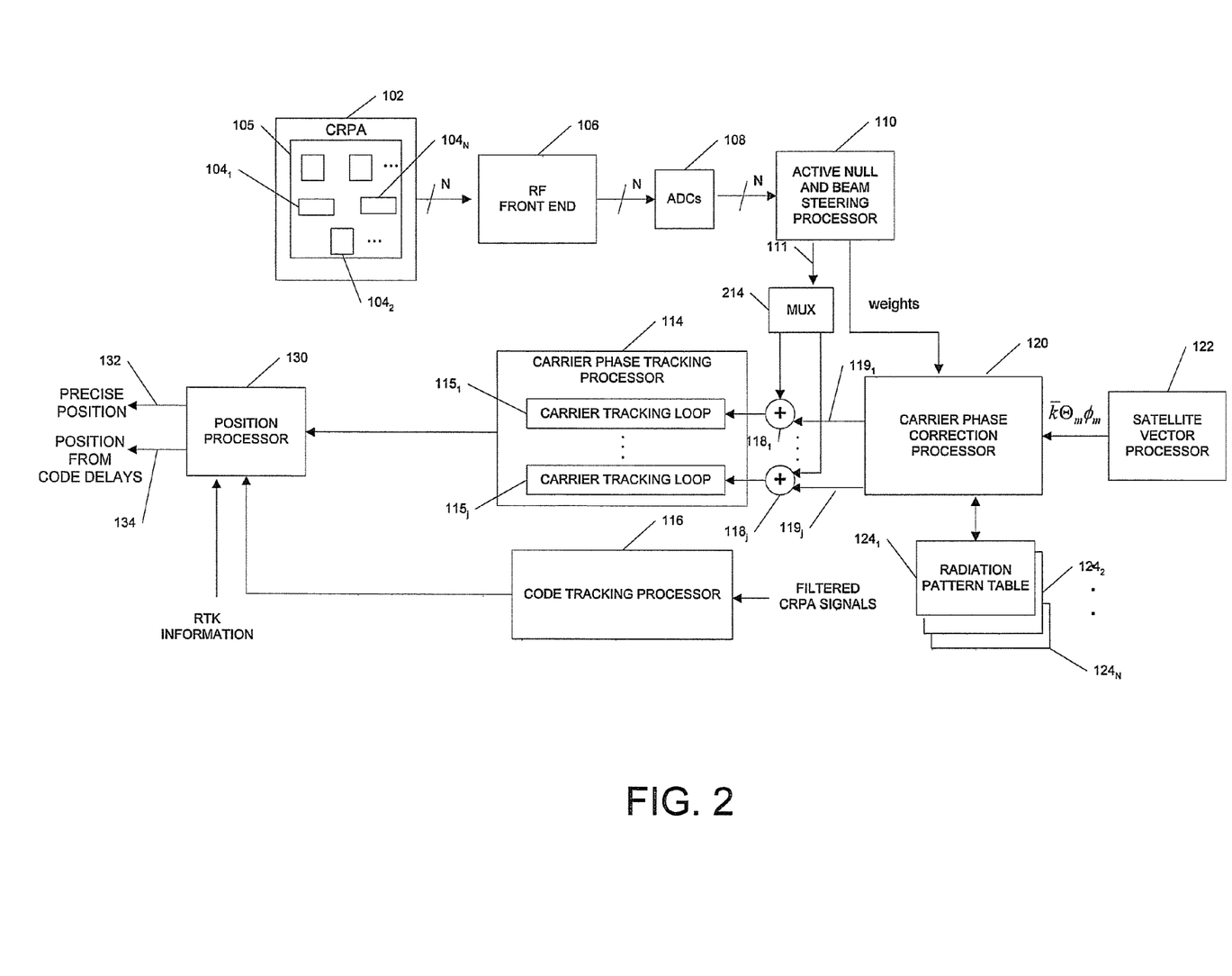
FIG. 2 is a functional block diagram of an alternative construction of the system of FIG. 1.

Referring to FIG. 2, when one or more constraints steer the antenna beam toward respective satellites or groups of satellites, the weight vector $\overline{w}$ produced by the active nulling and beam steering processor 110 varies by satellite. The receiver thus produces different CRPA filtered signals for the respective processing channels 115, all in a known manner. The CRPA filtered signals are provided on line 111 to a multiplexer 214, which provides the signals to the complex adders 118. A given CRPA filtered signal is phase-adjusted, as discussed above, by applying the unique phase correction $\Delta \Psi_m$ to the signal through a complex adder $118_m$, before the signal is processed for position determination in the corresponding channel $115_m$.

The respective filtered CRPA signals, either before or after phase adjustment, are also provided to respective channels of the code tracking processor 116, which operates in a conventional manner as discussed above with reference to FIG. 1.

The carrier phase correction sub-system included in the systems of FIGS. 1 and 2 can be readily incorporated into the operations of an existing GNSS receiver that utilizes a CRPA, which operates in a known manner to weight and combine signals from the antenna elements in order to, for example, produce a null that cancels out a jamming signal. The incorporation of the carrier phase correction sub-system enables the receiver to determine precise positions using carrier phase measurements made from phase adjusted CRPA filtered signals, and also, to utilize RTK information to resolve carrier cycle ambiguities. Without the carrier phase adjustment, antenna phase center movements associated with the weighting of the signals may adversely affect or even prohibit the use of short baseline RTK techniques to resolve carrier cycle ambiguities, and also introduce errors into the positions determined using the carrier phase measurements. Accordingly, without the carrier phase correction sub-system, the GNSS receiver would have to perform operations that are more processing intense in order to produce positions that are less precise.

In environments in which the jamming signals have high dynamics, the weight vectors applied to produce the associated nulls change relatively fast. Accordingly, the phase center movements associated with the application of the weights change relatively fast as well. In such an environment, the carrier phase corrections to remove the phase center movement are applied before the filtered CRPA signals are processed in the carrier phase tracking loops, to avoid problems associated with determining how the narrow bandwidth carrier phase tracking loops track such rapid phase center movements. Otherwise, the system would have to determine the tracking loop response to the signals as part of the calculation of the carrier phase. In an environment in which the jamming signals are expected to have low dynamics, the carrier phase corrections may be made after the filtered CRPA signals are processed by the carrier phase tracking loops, since the narrow bandwidth tracking loops will follow the slowly changing phase center movements.

Figure 4:
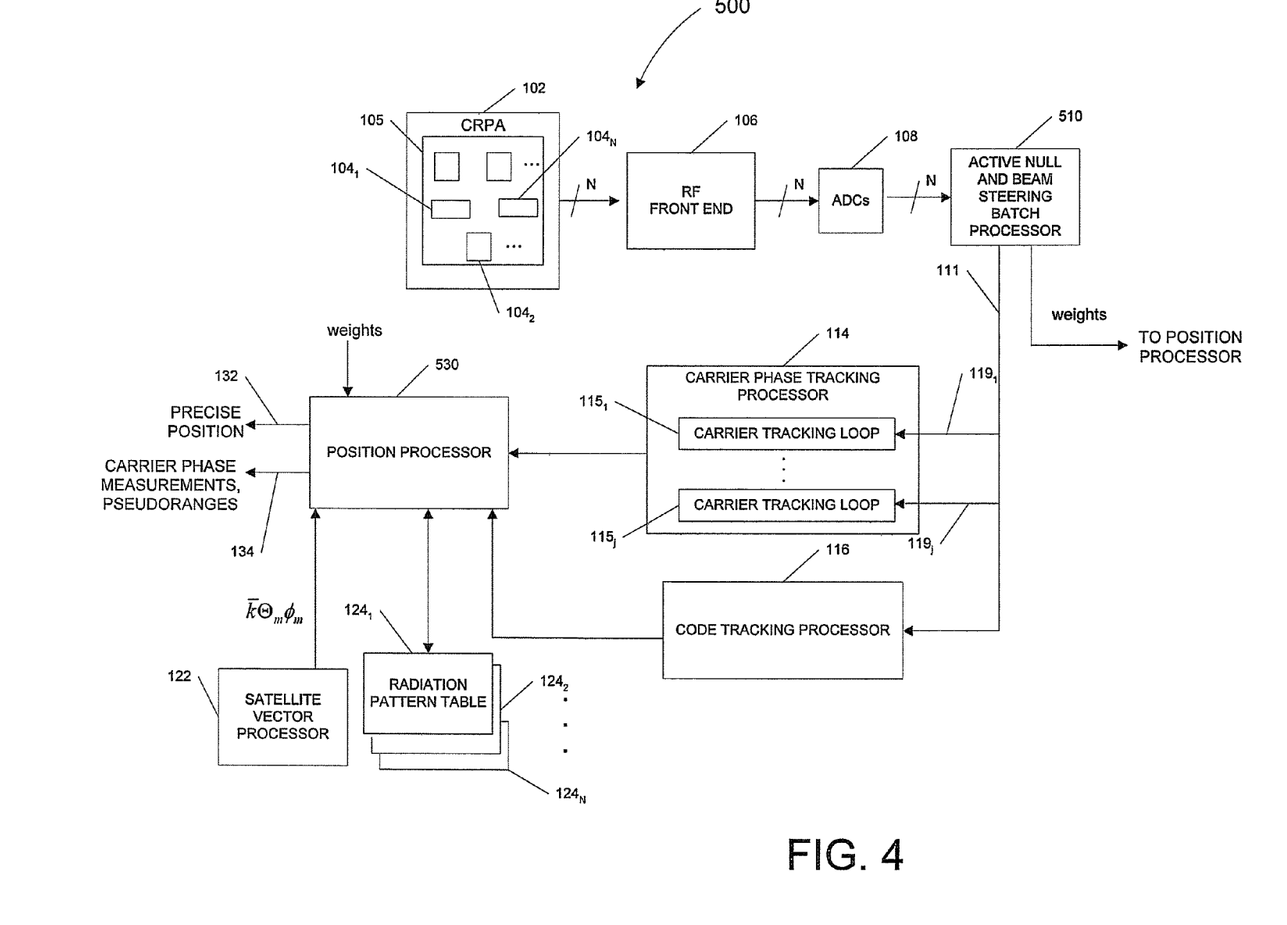
FIG. 4 is a functional block diagram of an alternative construction of a GNSS base station constructed in accordance with the invention.

Referring now to FIG. 4 a GNSS base station 500 operates in an urban environment in which the expected jamming signals originate from either fixed-location telecommunications equipment, such as, for example, one or more cell towers (not shown), and/or from relatively slow moving pedestrian cellular telephone traffic (not shown). In such an environment, the dynamics of the jamming signal are low and the updates to the null steering vectors may be made periodically, such as once per second for slow moving pedestrian traffic and less frequently, such as once an hour, for the fixed-location jamming signals. The carrier phase corrections, which compensate for phase center movements associated with the application of the weights, are also slowly changing. Accordingly, the corrections may be applied directly to the respective carrier phase measurements.

An active null and beam steering processor 510, using the known null steering techniques as discussed above, calculates the updated null steering vectors, or weights, by periodically processing batches of collected digitized RF samples. The weights are applied to the respective received signals and the weighted signals combined to produce the filtered CRPA signals, to remove the jamming signals from the position calculations. The CRPA filtered signals are then provided to the carrier phase tracking processor 114, which operates in a known manner to make the carrier phase measurements.

The weights are also provided to the position processor 530, which calculates the carrier phase corrections for the respective satellite signals, to compensate for the phase center movement associated with the weighting of the signals. The position processor operates as described above to calculate the correction $\Delta\psi_m$ for the carrier phase measurements of the respective satellite signals. The satellite vector processor 122 also operates as discussed above, and provides the azimuth and elevation angles and associated wave vectors to the position processor 530, and the position processor utilizes the angles and the wave vector as well as the radiation values from the radiation tables $124_1 \ldots 124_N$, all as described above in the calculations. The position processor also applies the corrections to the carrier phase measurements to determine pseudoranges, position and other base station products such as RTK information. The receiver may then broadcast the RTK information using a transmitter (not shown).

The GNSS base stations 500 may be used also or instead for deformation monitoring at, for example, area buildings or infrastructure. The calculated positions are thus analyzed to detect movement that indicates deformation.

Existing GNSS base receivers that operate with steered antenna arrays can be readily upgraded to take advantage of the carrier phase corrections by the inclusion of software or firmware to calculate the corrections as part of the position calculations. The GNSS base station can thus calculate precise positions, pseudoranges and so forth using the corrected carrier phase measurements and, as appropriate, provide the pseudoranges and position information to area rovers as part of the RTK information.

The foregoing description has been directed to specific embodiments of the invention. It will be apparent, however, that other variations and modifications, such as combining system components such as processors into a single component or separating a processor into additional components, performing certain or all of the processing operations in software, hardware or firmware, and so forth, may be made to the described embodiments, with the attainment of some or all of the advantages. In particular, a phase and delay equalization may be performed before weights are applied to the antenna element signals, or equalization may be performed after the weights are applied. Further, the orientation of the antenna array may be determined using stored or operator provided information, signals from local sensors, or from times of arrival of the satellite signals at the respective antenna elements and/or the use of a phase map. A multiplexer may instead be switches or other components that perform the same or a similar operation to provide CRPA filtered signals to the respective processing channels of the carrier tracking processor. The carrier tracking loops may use any of the well known techniques of taking carrier phase measurements. Further, a single processor may be utilized in the GNSS base receiver to calculate the null steering vectors as well as the carrier phase corrections and position, and a filter (not shown) may be included to apply the null steering weights to the received satellite signals. Therefore, it is the object of the appended claims to cover all such variations and modifications as come within the true spirit and scope of the invention.

What is claimed is:

1. A Global Navigation Satellite System (GNSS) positioning system including:
    a controlled radiation pattern antenna (CRPA) consisting of an array of antenna elements;
    a null and beam steering processor configured to assign weights to the antenna element signals to produce one or more nulls in response to jamming signals, the processor combining the weighted signals to produce one or more CRPA filtered signals;
    a carrier phase correction sub-system configured to calculate phase corrections for the CRPA filtered signals based on the assigned weights, azimuth and elevation angles of a given satellite relative to an orientation of the array of antenna elements, and radiation pattern values associated with the respective antenna elements, the sub-system combining the phase correction with the CRPA filtered signals to produce corrected CRPA filtered signals;
    a carrier phase tracking processor configured to take carrier phase measurements from the corrected CRPA filtered signals; and
    a position processor configured to determine position based on the carrier phase measurements.

2. The system of claim 1 wherein one or both of the carrier phase correction sub-system and the position processor are further configured to use real time kinematic (RTK) information to resolve carrier cycle ambiguities in the carrier phase measurements.

3. The system of claim 2 wherein the null and beam steering processor is further configured to steer an antenna beam toward one or more GNSS satellites in accordance with one or more constraints.

4. The system of claim 1 wherein the carrier phase correction sub-system is further configured to calculate the carrier corrections as:

$$Y_m = \sum_{i=1}^{N} R_i(\theta_m, \phi_m) w_i e^{j(\overline{k_m} \cdot \overline{r_i})} = |Y_m| e^{j\Delta \psi_m}$$

where,
- $Y_m$ is the complex CRPA created distortion to the phase of the received signal from the m'th satellite;
- $\Theta_m$ is the elevation angle of the m'th satellite which is defined by the satellite position relative to the antenna array orientation;
- $\phi_m$ is the azimuth angle of the m'th satellite which is defined by the satellite position relative to the antenna array orientation;
- $w_i$ is the complex weighting factor for the $i^{th}$ antenna element determined by the CRPA null and beam steering algorithm;
- $R_i$ is the radiation pattern value for the $i^{th}$ antenna element;
- $\overline{k}_m$ is the wave vector which describes the rate of change in phase in the direction of the wave propagation from the m'th satellite being monitored to the phase center of the antenna array;
- $\overline{r}_i$ is the displacement vector from the phase center of the antenna array to the location of the $i^{th}$ antenna element;
- $\Delta \psi_m$, is the change in carrier phase attributable to the phase center movement caused by the CRPA steering process for the signal arriving from the m'th satellite, and $$\Delta \psi_m = \arctan\left(\frac{\text{imag}(Y_m)}{\text{real}(Y_m)}\right).$$

5. The system of claim 1 wherein the null and beam steering processor is further configured to steer the antenna beam in accordance with a constraint to point upward.

6. The system of claim 1 wherein the null and beam steering processor is further configured to assign the weights to also steer the antenna beam in accordance with one or more constraints to point toward respective GNSS satellites.

7. The system of claim 1 wherein the carrier phase correction sub-system is configured to determine the orientation of the array based on the times of arrival of the satellite signals at the respective antenna elements.

8. The system of claim 7 wherein the carrier phase correction sub-system is configured to utilize a phase map entered using azimuth and elevation angles to determine the orientation.

9. The system of claim 7 wherein at least two of the antenna elements are spaced apart by one wavelength or less of the carrier signal of interest and the orientation of the CRPA is determined directly from the times of arrival of the satellite signals at the two antenna elements.

10. The system of claim 1 further including a sensor for determining the orientation of the array, the sensor providing the orientation information to the carrier phase correction sub-system.

11. A method of determining position using Global Navigation Satellite System (GNSS) signals, comprising:
   receiving signals from GNSS satellites using a controlled pattern radiation antenna (CRPA) that includes an array of antenna elements;
   assigning weights to the antenna element signals to produce one or more nulls in response to one or more jamming signals and combining the weighted signals to produce one or more CRPA filtered signals;
   calculating phase corrections for the CRPA filtered signals based on the assigned weights, angles of incidence of the GNSS satellite signals with respect to the orientation of the array, and radiation pattern values associated with the respective antenna elements;
   combining the phase corrections and the CRPA filtered signals to produce corrected CRPA filtered signals;
   taking carrier phase measurements from the corrected CRPA filtered signals; and
   determining position based on the carrier phase measurements.

12. The method of claim 11 wherein the position is determined using real time kinematic (RTK) information to resolve carrier cycle ambiguities in the carrier phase measurements.

13. The method of claim 12 wherein the assigning of weights further steers an antenna beam toward one or more transmitters in accordance with one or more constraints.

14. The method of claim 11 wherein the phase corrections are calculated as:

$$Y_m = \sum_{i=1}^{N} R_i(\theta_m, \phi_m) w_i e^{j(\overline{k_m} \cdot \overline{r_i})} = |Y_m| e^{j\Delta \psi_m}$$

where,
- $Y_m$ is the complex CRPA created distortion to the phase of the received signal from the m'th satellite;
- $\Theta_m$ is the elevation angle of the m'th satellite which is defined by the satellite position relative to the antenna array orientation;
- $\phi_m$ is the azimuth angle of the m'th satellite which is defined by the satellite position relative to the antenna array orientation;
- $w_i$ is the complex weighting factor for the $i^{th}$ antenna element determined by the CRPA null and beam steering algorithm;
- $R_i$ is the radiation pattern value for the $i^{th}$ antenna element;
- $\overline{k}_m$ is the wave vector which describes the rate of change in phase in the direction of the wave propagation from the m'th satellite being monitored to the phase center of the antenna array;
- $\overline{r}_i$ is the displacement vector from the phase center of the antenna array to the location of the $i^{th}$ antenna element;
- $\Delta \psi_m$ is the change in carrier phase attributable to the phase center movement caused by the CRPA steering process for the signal arriving from the m'th satellite, and $$\Delta \psi_m = \arctan\left(\frac{\text{imag}(Y_m)}{\text{real}(Y_m)}\right).$$

15. The method of claim 11 wherein assigning weights further includes steering the antenna beam in accordance with a constraint to point upward.

16. The method of claim 11 wherein assigning weights further includes
steering the antenna beam in accordance with one or more constraints to point toward particular GNSS satellites.

17. The method of claim 11 wherein the orientation of the array is determined based on the times of arrival of the GNSS satellite signals at the respective antenna elements.

18. The method of claim 16 wherein a phase map entered using azimuth and elevation angles is utilized to further correct the carrier phase measurements.

19. The method of claim 16 wherein at least two of the antenna elements are spaced apart by one wavelength or less of the carrier signal of interest and the orientation of the CRPA is determined directly from the times of arrival of the GNSS satellite signals at the two antenna elements.

20. A Global Navigation Satellite System base receiver positioning system including:
a controlled radiation pattern antenna (CRPA) consisting of an array of antenna elements;
a null and beam steering processor configured to assign weights to the antenna element signals to produce one or more nulls in response to jamming signals that are stationary or have low dynamics, the processor combining the weighted signals to produce one or more CRPA filtered signals;
a carrier phase tracking processor configured to make carrier phase measurements of one or more of the satellite signals included in the one or more CRPA filtered signals;
a position processor configured to
calculate phase corrections for the CRPA filtered signals based on the assigned weights, azimuth and elevation angles of the given satellite relative to an orientation of the array of antenna elements, and associated radiation pattern values for the respective antenna elements, the sub-system combining the phase correction with the carrier phase measurements to produce corrected carrier phase measurements; and
calculate position based on the corrected carrier phase measurements.

21. The base receiver of claim 20 wherein the position processor further analyses the calculated positions to detect movement that indicates deformation.

22. The base receiver of claim 20 wherein
the position processor further provides RTK information; and
a transmitter broadcasts the RTK information.

* * * * *